United States Patent
Babb et al.

(10) Patent No.: US 7,279,857 B2
(45) Date of Patent: Oct. 9, 2007

(54) SYSTEM, METHOD, AND COMPUTER-READABLE MEDIUM FOR REDUCTION OF COMMUTATION-RELATED ACOUSTIC NOISE IN A FAN SYSTEM

(75) Inventors: Samuel M. Babb, Fort Collins, CO (US); Jeffrey S. Weaver, Fort Collins, CO (US); James L. Yost, Fort Collins, CO (US); Garland E. Lee, Windsor, CO (US); Peter M. Piotrowski, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 482 days.

(21) Appl. No.: 10/650,028

(22) Filed: Aug. 27, 2003

(65) Prior Publication Data
US 2005/0047761 A1   Mar. 3, 2005

(51) Int. Cl.
*H02P 3/08* (2006.01)
(52) U.S. Cl. .............. 318/254; 318/138; 318/439; 318/432; 388/907; 388/911

(58) Field of Classification Search ............. 388/928.1, 388/907, 911; 318/138, 439, 254, 459, 560, 318/432
See application file for complete search history.

(56) References Cited

U.S. PATENT DOCUMENTS

| 5,010,576 | A  | * | 4/1991  | Hill ........................... 381/71.9 |
| 5,592,058 | A  | * | 1/1997  | Archer et al. ............... 318/254 |
| 6,208,113 | B1 | * | 3/2001  | Lelkes et al. ............... 318/807 |
| 6,252,362 | B1 | * | 6/2001  | White et al. ................ 318/254 |
| 6,323,609 | B1 | * | 11/2001 | Lopez ....................... 318/254 |
| 6,512,343 | B1 | * | 1/2003  | Yasohara ................... 318/437 |
| 6,864,659 | B2 | * | 3/2005  | Ratz et al. .................. 318/772 |
| 6,972,539 | B1 | * | 12/2005 | Codilian et al. ............ 318/560 |

OTHER PUBLICATIONS

Gardner, Ph.D, Floyd M., "Phaselock Techniques," John Wiley & Sons, Second Edition, Copyright 1979, p. 10.

* cited by examiner

*Primary Examiner*—Rina Duda

(57) ABSTRACT

A method for reducing commutation-related acoustic noise in a fan system is provided. A constant frequency periodic signal is generated and a fan commutation event is synchronized with a zero level value of the constant frequency periodic signal. A system for controlling a direct current fan is provided. The system comprises a signal generator adapted to produce a periodic signal of a constant frequency and a phase-locked loop. A zero level value of the periodic signal is synchronized with a commutation event of the fan.

30 Claims, 4 Drawing Sheets

US 7,279,857 B2

SYSTEM, METHOD, AND COMPUTER-READABLE MEDIUM FOR REDUCTION OF COMMUTATION-RELATED ACOUSTIC NOISE IN A FAN SYSTEM

TECHNICAL FIELD OF THE INVENTION

This invention relates to motors and, more particularly, to a system and method for reducing commutation-related acoustic noise emitted from a fan motor.

BACKGROUND OF THE INVENTION

Electrically powered fans used in computer and electronic equipment produce acoustic noise that users find objectionable or annoying. One prominent type of acoustic noise is generated by commutation events that cause torque modulation of a DC brushless fan rotor. The commutation event comprises switching a DC source voltage between windings of the fan. This results in each winding being driven by essentially square current waveforms with an impulse-like profile. The very rapid rise and fall rates of the square current waveform applied to the fan windings cause a torque modulation of the fan rotor. The commutation events are continuously generated while the fan is being driven and are characterized by an acoustic buzzing sound emitted from the fan. The acoustic noise is most noticeable at low fan rotations but is present at all fan speeds.

SUMMARY OF THE INVENTION

In accordance with an embodiment of the present invention, a method for reducing commutation-related acoustic noise emitted in a fan system is provided. A constant frequency periodic signal is generated and a fan commutation event is synchronized with a zero level value of the constant frequency periodic signal.

In accordance with another embodiment of the present invention, a system for controlling a direct current fan is provided. The system comprises a signal generator and a phase-locked loop adapted to produce a periodic signal of a constant frequency and variable amplitude. A zero level value of the periodic signal is synchronized with a commutation event of the fan.

In accordance with another embodiment of the present invention, a computer-readable medium having stored thereon an instruction set to be executed, the instruction set, when executed by a processor, causes the processor to perform a computer method of generating a periodic signal of a constant frequency and synchronizing a fan commutation event with a zero level value of the periodic signal is provided.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1 through 8 of the drawings, like numerals being used for like and corresponding parts of the various drawings.

Figure 1:
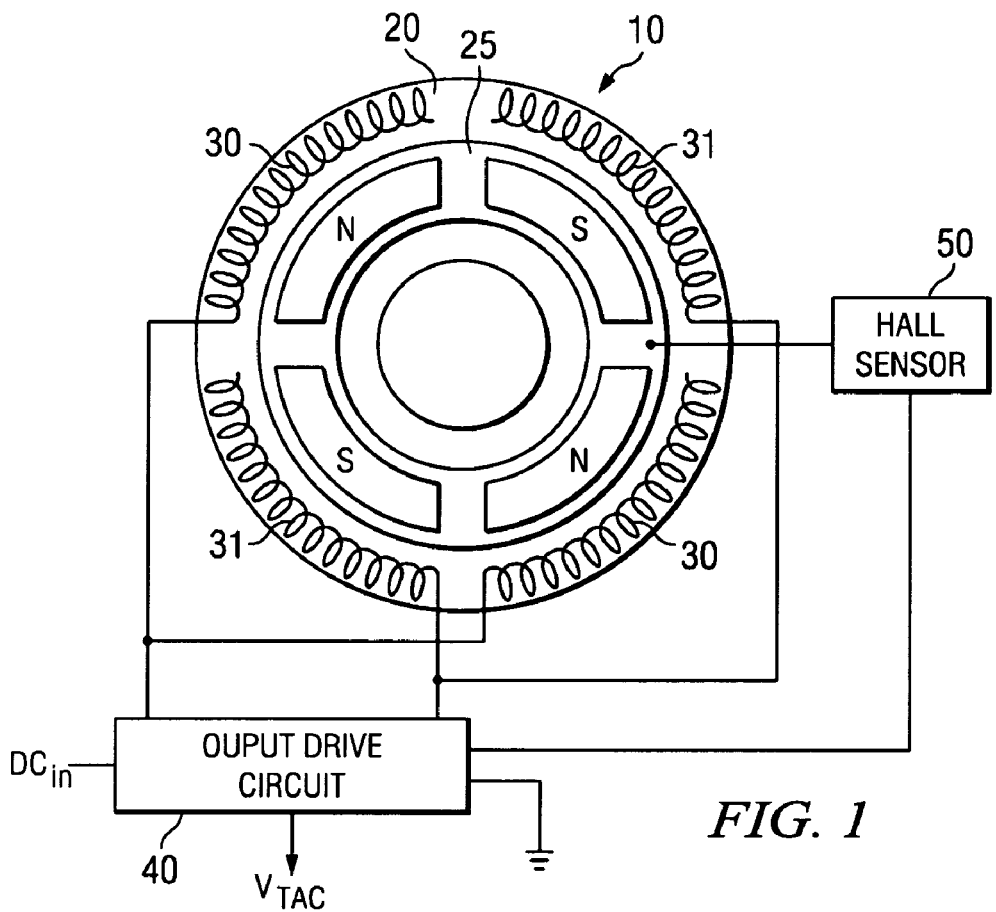
FIG. 1 is a simplified schematic of a fan that may be driven by a control system implemented in accordance with embodiments of the present invention.
Figure 2:
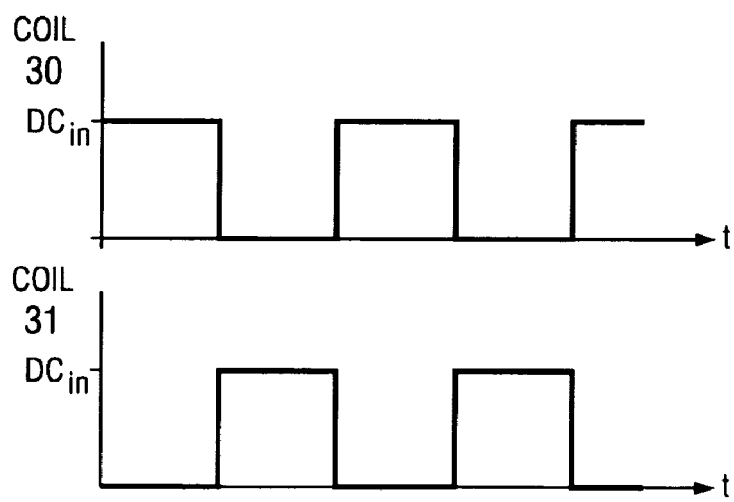
FIG. 2 is a voltage waveform diagram of a conventional source voltage for driving the fan of FIG. 1.

FIG. 1 is a simplified schematic of a fan 10 as may be implemented in a cooling system of a personal computer or other electronics device. Fan 10 is illustrated as a direct current (DC) brushless fan. Fan 10 is driven by a fan control system implemented in accordance with embodiments of the invention. Fan 10 comprises a stator 20 including a plurality of coils 30 and 31, or electromagnets. A rotor 25 comprises permanent magnets that are caused to rotate by applying electrical current of an appropriate polarity, shape and magnitude to coils 30 and 31. An output drive circuit 40 is electrically coupled with coils 30 and 31 and is supplied with a source voltage ($DC_{in}$) and commutates motor 10 therewith. In general, when the polarity of rotor 25 is magnetically aligned with coil 30, output drive circuit 40 switches the source voltage to coil 31, and vice versa. Accordingly, a rotating magnetic force is commutatively applied to coils 30 and 31.

In the illustrative example, a sensor probe 50 detects the alignment of rotor 25 and generates a signal used by output drive circuit 40 to commutate the motor. The output drive circuit 40 produces a tachometer signal ($V_{TAC}$) that indicates the fan speed. Knowledge of the motor parameters and sensor probe configuration enables derivation of the rotor position and thus commutation phase. As described herein, it is assumed that motor 10 is commutated at onset, i.e., rise, of the tachometer signal. The exemplary fan 10 comprises a two-phase DC brushless motor and, consequently, the sensor probe signal provides two pulses per fan rotation. In the illustrative example, output drive circuit 40 supplies a half-wave rectified square voltage to each of windings 30 and 31 as shown in the voltage waveform schematic of FIG. 2. The rectangular profile of the source voltage applied to coils 30 and 31 causes a sudden torque modulation of the fan rotor that generates commutation-related acoustic noise.

Embodiments of the present invention provide a technique for supplying a periodic source voltage to a fan motor that is synchronized with the fan motor commutation such that little, if any, winding current is present at onset of the commutation event. Additionally, the applied voltage is shaped in an optimum fashion to minimize torque modulation; the optimum wave shape is a half sinusoid. In a preferred embodiment, a technique is provided for supplying a rectified sinusoidal source voltage with zero crossings (that is, zero value levels of the sinusoidal source voltage) phase-locked to a fan tachometer signal indicative of the motor phase. The phase-locking is accomplished by modulating the amplitude of the drive signal to cause the relative phase between the fan tachometer signal and the zero crossings of the source voltage to be a constant. This technique accounts for the fan being a slightly inductive load with the winding current slightly lagging the winding voltage. Driving the source voltage by a constant phase offset from the tachometer signal enables placing the commutation event at a zero current point, or zero value level, in the winding waveform.

Figure 3A:
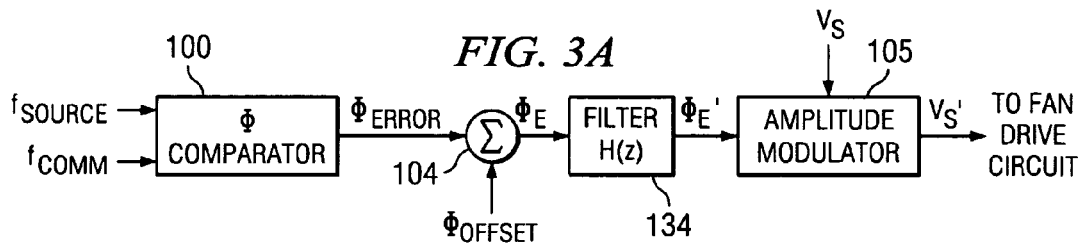
FIG. 3A is a simplified block diagram of a fan control system implemented according to embodiments of the invention.

FIG. 3A is a simplified block diagram of a phase comparator 100, a phase offset summer 104, a filter 134 and an amplitude modulator 105 for a fan control system implemented according to embodiments of the invention. A frequency ($f_{SOURCE}$) signal having a constant frequency corresponding to the frequency of a periodic source voltage used to drive fan 10 and a commutation signal ($f_{COMM}$) indicating the motor commutation frequency and phase are supplied to phase comparator 100 that generates an error signal ($\Phi_{ERROR}$) as a measure of the phase offset therebetween. The commutation signal indicates the onset of a switching cycle between fan windings and thus corresponds with the fan commutation event with which a periodic drive signal ($V_s'$) supplied to fan 10 is to be synchronized. An appropriate phase offset $\Phi_{OFFSET}$ is then added to the phase error signal by phase offset summer 104. The resultant adjusted phase error signal $\Phi_E$ is appropriately filtered by filter 134 according to one or more of various filtering techniques for implementation in a phase-locked loop as is well-known in the art. For example, filter 134 may be implemented as a lead-lag type filter such as those described by Gardner, Floyd M., in "*Phaselock Techniques*", John Wiley and Sons, second edition, 1978, page 10. A periodic reference signal ($V_s$) having a frequency $f_{SOURCE}$ is supplied to amplitude modulator 105 and is modified, i.e., attenuated or amplified, according to a filtered phase error $\Phi_E'$. The drive signal $V_s'$ produced by amplitude modulator 105 has the frequency $f_{SOURCE}$ and is commutatively supplied to the stator windings of fan 10. Thus, drive signal $V_s'$ is an amplitude modulated replica of reference signal $V_s$.

Figure 3B:
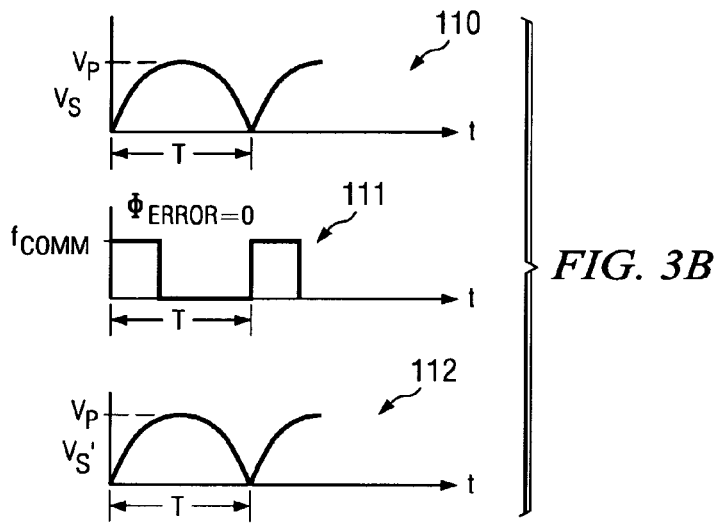
FIG. 3B is a waveform diagram of a phase-locked reference signal and commutation signal for the control system described with reference to FIG. 3A.
Figure 3C:
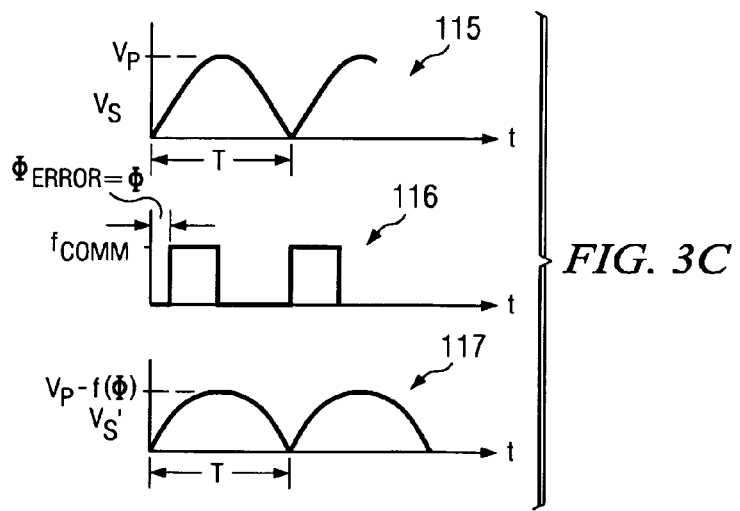
FIG. 3C is a waveform diagram of a commutation signal that leads the reference signal being phase-locked by the control system described with reference to FIG. 3A.
Figure 3D:
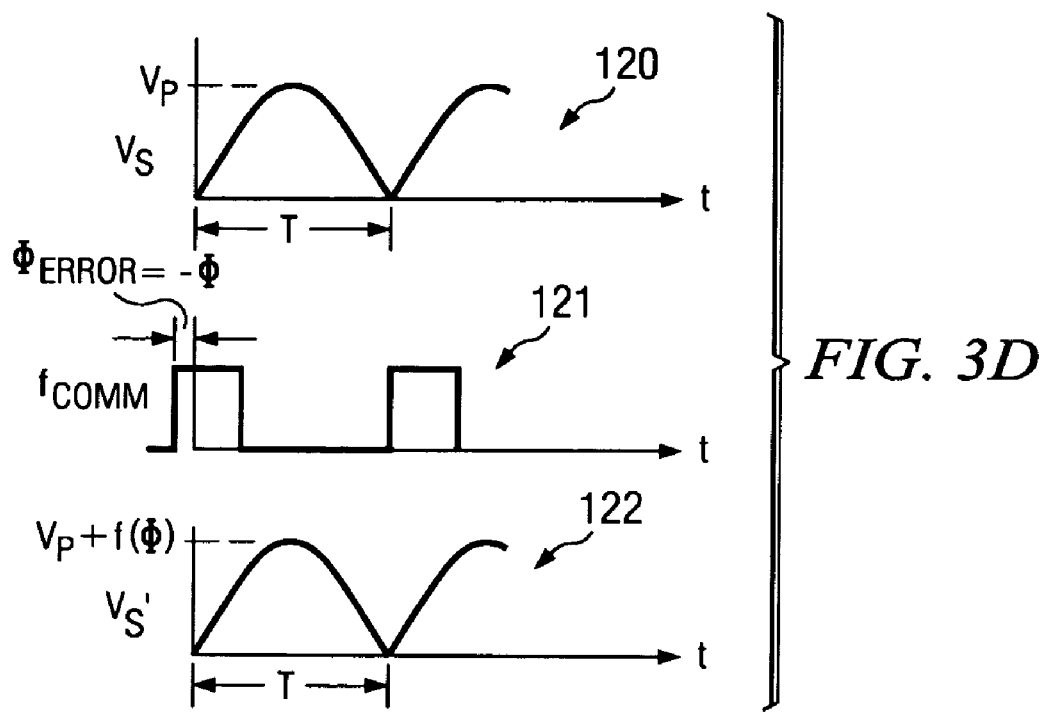
FIG. 3D is a waveform diagram of a commutation signal lagging a reference signal being phase-locked by the control system described with reference to FIG. 3A.
Figure 3E:
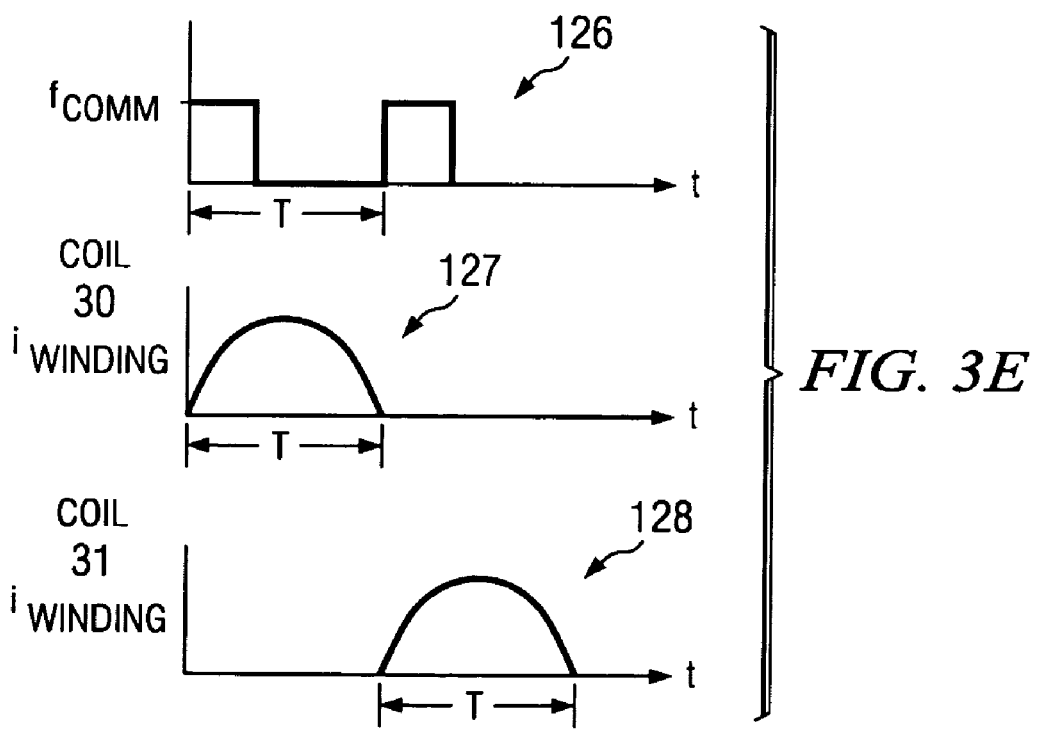
FIG. 3E is a waveform diagram of a commutation signal phase-locked with drive currents in accordance with embodiments of the present invention.

FIG. 3B is a waveform diagram of a phase-locked reference signal 110 and commutation signal 111. Reference signal 110 comprises a peak amplitude $V_p$ phase-locked with commutation signal 111. As shown, each of the reference signal 110 and commutation signal 111 has a cycle period T and are mutually in-phase. Accordingly, a drive signal 112 output by amplitude modulator 105 corresponds to reference signal 110, and is conveyed to output drive circuit 40 for supply to fan 10. FIG. 3C is a waveform diagram of a reference signal 115 and a commutation signal 116 in which commutation signal 116 leads reference signal 115 by a phase error $\Phi$. A fan having the reported commutation signal 116 is running at a higher frequency than reference signal 115. Accordingly, a reduction in the amplitude of drive signal 117 is made that corresponds with the detected phase error such that the fan speed is reduced causing commutation signal 116 to converge with drive signal 117. FIG. 3D illustrates a commutation signal 121 that lags a reference signal 120 by a phase error $-\Phi$ indicating fan 10 is rotating too slowly for the desired fan frequency (1/T). The amplitude of drive signal 122 is increased as a function of the phase error such that the fan motor speed increases causing commutation signal 121 to converge with drive signal 122.

In the illustrative examples of FIGS. 3B-3D, a reference signal from which a drive signal $V_s'$ is derived is shown and described as being locked in phase with commutation signal $f_{COMM}$. It should be understood that such a phase relationship is shown only to facilitate an understanding of the teachings of the invention and is representative of a drive signal $V_s'$ applied to a fan motor that provides no inductive load—a quality not typically realized in common fan motors. Thus, the phase relationship between the drive signal $V_s'$ and commutation signal $f_{COMM}$ shown results from a phase offset $\Phi_{OFFSET}$ of zero. The actual inductive fan load (and thus the value of the phase offset $\Phi_{OFFSET}$ summed with the phase error $\Phi_{ERROR}$) may, and typically does, vary among different fan models and may additionally vary for different operational speeds of a particular fan. It is understood by those skilled in the art that the drive signal phase is preferably adjusted by a constant phase offset $\Phi_{OFFSET}$ such that a drive current ($i_{WINDING}$) induced by the drive signal $V_s'$ voltage has a zero crossing locked to onset of the commutation event as shown by the waveforms of a commutation signal 126 and drive currents 127 and 128 respectively induced in coils 30 and 31 in FIG. 3E. Thus, embodiments of the invention provide a constant frequency, variable amplitude drive signal phase-locked with a fan commutation event in a manner that reduces audible fan noise by eliminating, or minimizing, the torque modulation of the fan motor at the commutation event.

Figure 4:
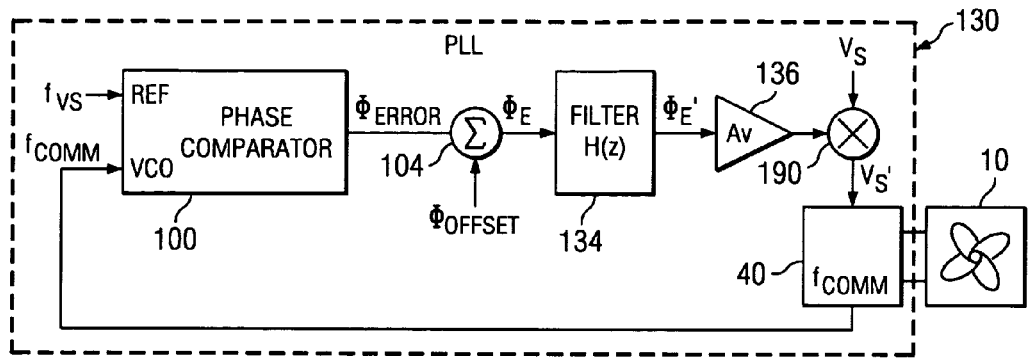
FIG. 4 is a block diagram of a phase-locked loop for enabling synchronization of a periodic drive signal with a commutation event of a fan motor in accordance with embodiments of the invention.

FIG. 4 is a block diagram of a phase-locked loop (PLL) 130 for enabling synchronization of a periodic drive signal with a commutation event of a fan motor in accordance with embodiments of the invention. A reference signal frequency ($f_{vs}$) and a commutation signal $f_{COMM}$ are supplied to a phase comparator 100. The reference signal frequency $f_{vs}$ defines the frequency of a reference voltage waveform from which the fan drive signal $V_s'$ is generated. In the illustrative examples described herein, fan 10 comprises a two-phase fan and two commutation events are accordingly monitored per fan revolution. The selection of a two-phase fan is made for illustrative purposes and embodiments of the invention may be implemented on a fan of any configuration. In the illustrative example, one drive signal cycle corresponds to a single commutation event and thus the desired fan frequency is one-half the reference signal frequency $f_{vs}$. The commutation signal $f_{COMM}$ identifies the frequency and phase of a commutation event of fan motor 10 and comprises the voltage controlled oscillator (VCO) input supplied to phase comparator 100. Phase comparator 100 generates a phase error that is a measure of the phase difference between the reference signal frequency and the commutation signal. A phase error $\Phi_{ERROR}$ is adjusted by phase offset $\Phi_{OFFSET}$ in phase offset summer 104. An adjusted phase error $\Phi_E$ is conveyed to filter 134. A filtered phase error $\Phi_E'$ is supplied to an amplifier 136. The gain of amplifier 136 causes the frequency of the commutation events to deviate towards the reference signal frequency $f_{vs}$. In the illustrative example, the filtered and amplified phase output is supplied to a multiplier 190. A periodic reference signal $V_s$ of constant frequency corresponding to reference signal frequency $f_{vs}$ is supplied to multiplier 190 and is amplitude modulated according to the phase error such that the commutation frequency locks to the drive signal frequency, i.e., $f_{vs}$. A drive signal $V_s'$ produced by multiplier 190 is supplied to drive circuit 40 for commutation of motor 10. The frequency of fan 10, and thus the commutation frequency, is controlled by the output of phase detector 100. Output drive circuit 40 commutates fan 10 at a commutation frequency directly related to fan 10 frequency and thus provides the oscillator of PLL 130. The commutation signal may be conveyed to phase detector 100 directly from fan 10 in alternative embodiments, and other implementations for supplying a voltage-controlled oscillator frequency input that identifies a commutation frequency and phase to phase comparator 100 may be suitably substituted as is understood by those skilled in the art.

Figure 5:
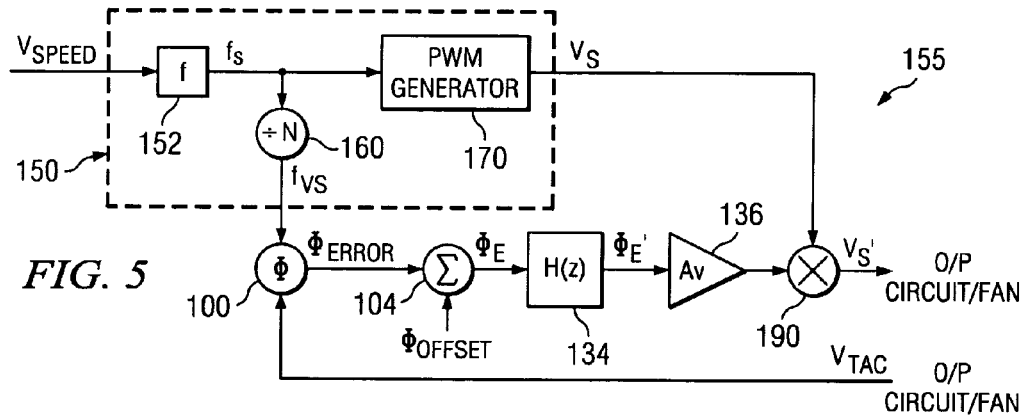
FIG. 5 is a block diagram of a control system implemented according to embodiments of the invention.

FIG. 5 is a block diagram of a fan control system 155 implemented according to embodiments of the invention. A speed input ($V_{SPEED}$) signal is supplied to a waveform generator 150 that derives a desired fan speed therefrom. The speed input signal may be generated from a temperature probe and comprise a voltage level indicative of a measured temperature. Other mechanisms may be substituted for generation of the speed input signal. Waveform generator 150 may be implemented in hardware, software, or a combination thereof. In one embodiment, a voltage level of the speed input $V_{SPEED}$ is mapped to an associated fan speed by a frequency generator 152 as described more fully hereinbelow. In general, a sample frequency $f_s$ signal, indicating a sample frequency of reference signal $V_s$ comprising a predefined number of N samples, is derived from speed input $V_{SPEED}$.

The sample frequency $f_s$ is supplied to a divider 160 that generates the reference signal frequency $f_{vs}$ (and thus the desired fan commutation frequency) that is N times lower than sample frequency $f_s$. That is, divider 160 receives as input a sample frequency $f_s$ that defines the sampling frequency of the reference signal and generates the desired reference signal frequency $f_{vs}$ therefrom.

The sample frequency $f_s$ is supplied to a periodic signal generator 170 and reference signal $V_s$ having N samples and a constant frequency of $f_{vs}$ is generated thereby. Reference signal $V_s$ may be generated using any of numerous techniques. Preferably, however, periodic signal generator 170 comprises a pulse-width modulation (PWM) generator and reference signal $V_s$ comprises a rectified sine wave constructed via PWM. In the present example, periodic signal generator 170 is adapted to produce reference signal $V_s$ comprising a rectified sine wave having N samples per cycle with each sample comprising a respective sequence of PWM pulses of a common duty cycle. The generated reference signal $V_s$ has a frequency of $f_{vs}$ derived from the speed input and, accordingly, a series of duty cycles output by periodic signal generator 170 are sequenced through at a frequency of $f_{vs}N$. That is, each sample of reference signal $V_s$ comprises a sample period $1/f_{vs}N$ corresponding to the duration periodic signal generator 170 outputs a sequence of PWM pulses of a particular duty cycle.

In the illustrative embodiment, the reference signal frequency $f_{vs}$ is supplied to phase comparator 100 along with a fan tachometer signal ($V_{TAC}$) that identifies onset of motor commutation, e.g., switching of electric fields across the fan stator windings. Thus, the reference signal frequency $f_{vs}$ derived from the speed input is used as the reference input and the fan motor tachometer signal that identifies motor commutation provides the voltage controlled oscillator input of the phase-locked loop of control system 155. Comparator 100 detects the phase error $\Phi_{ERROR}$ between the reference signal $V_s$ and the tachometer signal $V_{TAC}$ obtained from output drive circuit 40. The phase error $\Phi_{ERROR}$ indicates the measured phase offset between the reference signal $V_s$ and the fan commutation. The phase error is adjusted by a phase offset $\Phi_{OFFSET}$ in phase offset summer 104 and the adjusted phase error $\Phi_E$ is supplied to filter 134. Filtered phase error $\Phi_E'$ is supplied to amplifier 136. Preferably, filter 134 comprises an integrating circuit that integrates the error signal and a gain coefficient generated by amplifier 136 is supplied to a multiplier 190. Reference signal $V_s$ is then amplitude modulated according to the gain coefficient by supply of the gain coefficient and the reference signal $V_s$ to multiplier 190. Accordingly, reference signal $V_s$ is amplified, attenuated, or, in the event that no phase error is present, not varied and an amplitude modulated drive signal $V_s'$ is output from multiplier 190. The amplitude modulated drive signal $V_s'$ is then supplied to output drive circuit 40 for commutating fan 10 therewith. Accordingly, a constant frequency, variable amplitude periodic source voltage is commutatively supplied to the fan stators in a manner that locks the fan tachometer signal to the source voltage frequency. The commutation of fan 10 is phase-locked to the source voltage supplied thereto by changes in the amplitude of the source voltage made in response to detected phase errors between the fan commutation and the zero level of the reference signal from which the source voltage is generated. In the particular implementation shown and described in FIG. 5, reference signal $V_s$ comprises a PWM rectified sinusoidal signal and, accordingly, amplitude modulation of the reference signal is achieved by varying the duty cycle of the PWM pulses in each sample of the reference signal for production of drive signal $V_s'$.

Figure 6:
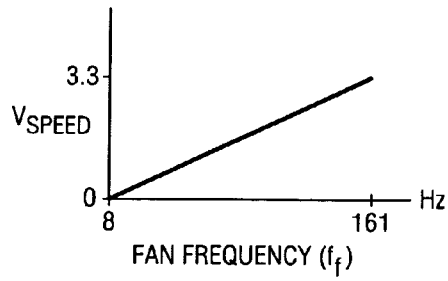
FIG. 6 is an illustrative mapping of a speed input signal to a frequency for running a fan motor according to embodiments of the invention.

In one embodiment, the speed input $V_{SPEED}$ comprises a signal to which the voltage level is mapped to a speed or frequency at which the fan motor is to be run. FIG. 6 shows an illustrative mapping of the speed input to a desired fan frequency $f_f$. A minimum fan frequency, e.g., 8 Hz, is mapped to a zero value of the speed input. The highest desired fan frequency, in the present example 161 rotations per second, is mapped to the peak value of the speed input signal, e.g., a $V_{SPEED}$ value of 3.3 volts. The illustrative mapping provides a linear relationship between the speed input and the fan frequency although other more complex mappings may be substituted therefor. In general, a desired fan frequency is obtained from an associated voltage level of the speed input signal. It should be apparent that derivation of the source voltage frequency is implicit with determination of the desired fan frequency. In the illustrative embodiments described herein, fan 10 comprises a two-phase fan and accordingly requires two commutations per fan rotation. Thus, the requisite reference signal frequency $f_{vs}$ is twice the desired fan frequency $f_f$.

Figure 7:
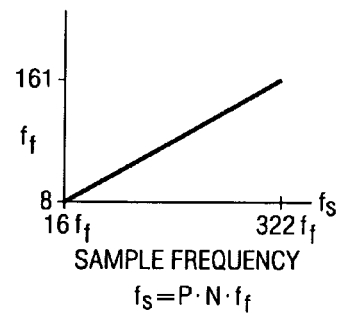
FIG. 7 illustrates an exemplary mapping of a desired fan frequency to a sample sequencing frequency as implemented according to embodiments of the invention.

In the exemplary embodiments, the drive signal $V_s'$ comprises a PWM encoded sine signal having N samples. In general, periodic signal generator 170 outputs reference signal $V_s$ as a sequence of N PWM encoded samples. Each sample of reference signal $V_s$ comprises a sequence of PWM pulses of a common duty cycle. Production of PWM encoded reference signal $V_s$ is made by periodic signal generator 170 outputting a series of PWM pulses of a particular duty cycle for each sample period $1/f_{vs}N$, that is $1/f_s$. FIG. 7 illustrates an exemplary mapping of the desired fan frequency $f_f$ to sample frequency $f_s$. In general, sample frequency $f_s$ is defined as the product of the desired fan frequency, the number of samples N in the reference signal $V_s$, and the number (P) of fan phases. In the present example, fan 10 comprises a two-phase fan and the sample frequency ranges from 16f_f to 322f_f and defines the frequency at which periodic signal generator 170 cycles through a duty cycle sequencing period. While implementation of waveform generator 150 has been described as a PWM generator, other techniques of generating reference signal $V_s$ may be substituted therefor.

Figure 8:
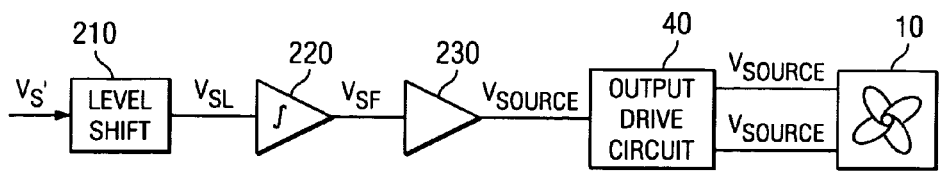
FIG. 8 is a system schematic for conditioning a drive signal for driving the fan motor in accordance with embodiments of the invention.

The amplitude modulated drive signal $V_s'$ is preferably conditioned for driving the fan motor as shown by the system schematic of FIG. 8. The drive signal $V_s'$ is supplied to a level shifter 210 that scales the voltage level to a suitable level for driving fan 10, e.g., to a maximum rms value equivalent to the rated DC input of fan 10. The level shifted source voltage ($V_{SL}$) is then supplied to an integrator 220, e.g., a filter such as a low pass filter, for removing the high frequency switching residuals resulting from the PWM encoding of the reference signal. A filtered periodic source voltage ($V_{SF}$) is then supplied to a power transistor or other amplification stage 230 for generation of a suitable drive current for fan 10. The fan motor 10 is then commutated with source voltage $V_{SOURCE}$ by output drive circuit 40.

The control system (or a portion thereof) described may be implemented as an instruction set(s), or program, of computer-readable logic. The instruction set is preferably maintained on any one of various conventional computer-readable mediums. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electro-magnetic, infrared, or semi-conductor system, apparatus, device, or propagation medium now known or later developed.

What is claimed is:

1. A method for reducing commutation-related acoustic noise in a fan system, comprising:
   generating a constant frequency periodic signal; and
   synchronizing a fan commutation event with a zero level value of the constant frequency periodic signal, and wherein synchronizing the fan commutation event further comprises comparing the zero level value of the periodic signal with a tachometer signal indicating onset of the fan commutation event.

2. The method according to claim 1, wherein synchronizing a fan commutation event further comprises:
   comparing a phase of the periodic signal with a phase of the fan commutation event; and
   phase-locking the periodic signal to the phase of the fan commutation event.

3. The method according to claim 1, wherein generating a constant frequency periodic signal further comprises generating at least one of a sinusoidal voltage and current.

4. The method according to claim 1, further comprising:
   identifying a phase lag of the fan commutation event with respect to a phase of the periodic signal; and
   increasing an amplitude of the periodic signal.

5. The method according to claim 1, further comprising:
   identifying a phase lead of the fan commutation event with respect to a phase of the periodic signal; and
   decreasing an amplitude of the periodic signal.

6. The method according to claim 1, further comprising deriving the frequency of the periodic signal from a speed input signal.

7. The method according to claim 6, wherein deriving the frequency further comprises deriving the frequency of the periodic signal from the speed input signal comprising a voltage signal indicating a temperature.

8. The method according to claim 1, wherein generating a constant frequency periodic signal further comprises generating a pulse width modulated rectified sinusoidal signal.

9. The method according to claim 8, wherein generating a constant frequency periodic signal further comprises deriving a sample frequency of the periodic signal from the speed input.

10. A system for controlling a direct current fan motor, comprising:
    a signal generator adapted to produce a periodic signal of a constant frequency; and
    a phase-locked loop comprising a phase comparator configured to compare a phase of the periodic signal to a chase of a commutation event of the fan, the phase-locked loop adapted to synchronize a zero level value of the periodic signal with the commutation event of the fan and phase-lock the periodic signal to the phase of the commutation event.

11. The system according to claim 10, wherein the phase comparator is adapted to generate an error signal indicative of a phase offset between the periodic signal and the commutation event.

12. The system according to claim 11, wherein the phase-locked loop further comprises a multiplier, the multiplier adapted to amplitude modulate the periodic signal in response to an error signal.

13. The system according to claim 12, wherein the fan is commutated with the amplitude modulated periodic signal.

14. The system according to claim 10, wherein the signal generator further comprises a sinusoidal voltage generator adapted to produce a rectified sinusoidal voltage.

15. The system according to claim 14, wherein the frequency of the sinusoidal voltage is dependent on a speed input supplied to the system.

16. The system according to claim 10, wherein the signal generator further comprises a pulse width modulation generator.

17. The system according to claim 10, wherein the signal generator further comprises a pulse width modulation generator adapted to generate a rectified pulse width modulated sinusoidal signal of a pre-defined number of samples.

18. The system according to claim 17, wherein each sample respectively comprises a plurality of pulse width modulated pulses of a common duty cycle.

19. The system according to claim 10, wherein the phase-locked loop is adapted to amplitude modulate the periodic signal based on a phase offset between the periodic signal and the commutation event.

20. The system according to claim 10, wherein the signal generator further comprises a pulse width modulated generator adapted to produce a rectified sinusoidal signal comprising a predefined number of samples.

21. The system according to claim 20, wherein each sample has a respective plurality of pulse width modulated pulses of a common duty cycle.

22. The system according to claim 21, wherein the phase-locked loop is adapted to synchronize the periodic signal with the commutation event by varying the duty cycles of the pulses in accordance with a phase offset between the periodic signal and the commutation event.

23. A computer-readable medium having stored thereon an instruction set to be executed, the instruction set, when executed by a processor, causes the processor to perform a computer method of:

generating a periodic signal of a constant frequency; and synchronizing a fan commutation event with a zero level value of the periodic signal, and wherein synchronizing the fan commutation event further comprises:

comparing a phase of the periodic signal with a phase of the fan commutation event; and phase-locking the periodic signal to the phase of the fan commutation event.

24. The computer-readable medium according to claim 23, wherein synchronizing the fan commutation event further comprises comparing the zero level value of the periodic signal with a tachometer signal indicating onset of the fan commutation event.

25. A method for controlling a fan, comprising:

generating a constant frequency periodic signal, the frequency of the periodic signal derived from a speed input signal comprising a voltage signal indicating a temperature; and synchronizing a fan commutation event with a zero level value of the constant frequency periodic signal.

26. The method of claim 25, further comprising:

comparing a phase of the periodic signal with a phase of the fan commutation event; and phase-locking the periodic signal to the phase of the fan commutation event.

27. The method of claim 25, further comprising:

identifying a phase lag of the fan commutation event with respect to the phase of the periodic signal; and increasing an amplitude of the periodic signal.

28. The method of claim 25, wherein generating the constant frequency periodic signal comprises generating a pulse width modulated rectified sinusoidal signal.

29. The method of claim 25, wherein generating the constant frequency periodic signal comprises generating at least one of a sinusoidal voltage and current.

30. The method of claim 25, further comprising:

identifying a phase lead of the fan commutation event with respect to the phase of the periodic signal; and decreasing an amplitude of the periodic signal.

* * * * *